Inventors:-
Charles H. Fox and
Wayne H. McGlade,
By:- Wolfe, Hubbard, Voit & Osann,
Their Attorneys.

United States Patent Office 3,559,312
Patented Feb. 2, 1971

3,559,312
DRIVE TRAIN FOR ABSORBING HIGHLY VARIABLE SHOCK LOADS
Charles H. Fox, Washington, and Wayne H. McGlade, Peoria, Ill., assignors to Westinghouse Air Brake Company, a corporation of Pennsylvania
Continuation of application Ser. No. 522,430, Jan 24, 1966. This application July 25, 1969, Ser. No. 847,804
Int. Cl. B60p 1/36; H02h 7/08
U.S. Cl. 37—8                                        4 Claims

ABSTRACT OF THE DISCLOSURE

A drive train is provided having sufficient flexibility to absorb high variable shock loads such as those encountered in the driving of the elavting conveyor of a self-loading scraper. This is accomplished by means of a hollow shaft and a second shaft disposed in the bore of the hollow shaft, with the torque source (an electric motor) drivingly connected with one of the two shafts and the conveyor driven by the other of the two shafts, the two shafts being connected by means of a flexible element such as a fluid coupling, the coupling and the motor being matched so that the maximum torque transmissible by the fluid coupling is greater than the locked-rotor torque of the motor and is less than the maximum torque output of the motor, whereby the coupling stalls without stalling the motor. A fusible plug in the coupling melts to allow the escape of coupling fluid and unload the motor before the motor destroys itself through overheating. A bushing between the shafts keeps them aligned and is slotted to provide passage means to allow oil from the coupling to flow the length of the hollow shaft for lubrication.

---

Figure 1:
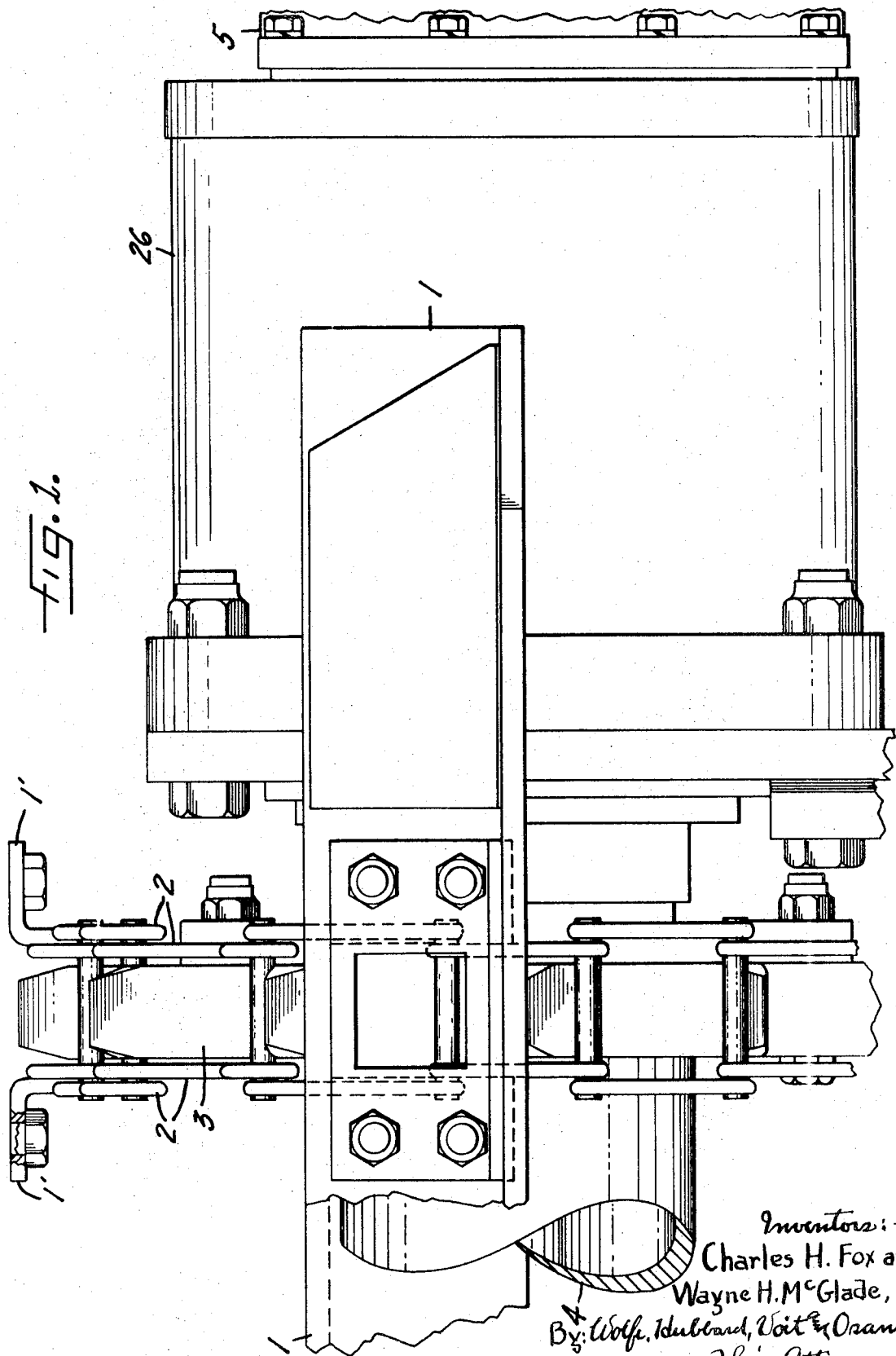

This application is a continuation of copending application Ser. No. 522,430, filed Jan. 24, 1966, now abandoned. This invention relates to drive trains, especially drive trains for earthmoving machines of the type commonly referred to as elevating scrapers.

Elevating scrapers of the type contemplated herein may be seen by referring to patents 2,988,832—Hancock et al., 2,994,976—Hancock, and 3,048,934—Hancock, issued June 20, 1961, Aug. 8, 1961, and Aug. 14, 1962, respectively. Each of the designated patents shows an elevating conveyor consisting of two endless chains carrying a plurality of flights secured to the chains transverse to the direction of forward motion of the scraper, the flights being equally spaced along the chains in a parallel relationship. In the scrapers shown in those patents, the elevating conveyor is powered by a drive mechanism connected with a shaft of the elevating conveyor. The means to drive the conveyor may be a power take-off connection with the engine of the prime mover, an electric motor, a hydraulic motor, or the like. The load which resists movement of the endless chains varies because of the spaced flights connected across the two endless chains. In other words, as one of the flights engages the dirt which has been cut loose by the scraper blade, that flight is loaded according to the depth of the "bite," the type of material or dirt being loaded, the moisture content of the dirt, and one or more possible additional factors. The factors listed (and unlisted) can and do vary as the scraper moves along in the cut, with the result that the load is imposed which is highly variable, both in frequency and amplitude. As a consequence, the torque source is submitted to a highly variable shock load, which can result in early failure of the torque source itself or the connecting drive train, or both. It therefore becomes highly desirable to introduce an element of flexibility (in the sense of torsional resilience) in the drive train between the torque source and the elevating conveyor drive.

It is accordingly an object of this invention to provide a drive train having sufficient flexibility to absorb highly variable shock loads such as those encountered in the driving of the elevating conveyor of a self-loading scraper such as is shown in the three patents identified above. This and other objects are accomplished in a hollow shaft and a second shaft disposed in the bore of the hollow shaft, with the torque source drivingly connected with one of the two shafts and the conveyor being driven by the other of the two shafts, the two shafts being connected by means of a flexible element such as a fluid drive. More specifically, in the preferred embodiment here shown, the torque source is an electric motor and the fluid drive is a fluid coupling, the coupling and the motor being matched so that the maximum torque transmissible by the fluid coupling is greater than the locked-rotor torque of the motor and is less than the maximum torque output of the motor, whereby the coupling stalls without stalling the motor.

Because the electric motor is overloaded under many of the slip operating conditions of the fluid drive, it is desirable to effect such a match of electric motor and fluid drive that, for any given load which could result in damage to the motor, the fluid drive will be interrupted before the motor could be damaged at that load. This is accomplished through a temperature sensitive element in the fluid drive, such as a fusible plug, which melts when the drive fluid reaches a predetermined high temperature and allows escape of the fluid.

It is in order to point out here that damage can go either way in a drive train such as is contemplated here. If the conveyor is driven directly by an electric motor through a gear reduction, sudden stalling of the load (the conveyer) can destroy the gear box by the sudden impulse load of stored energy which tries to "keep on going"; this is often referred to by engineers as the "$WR^2$" shock load. Such damage is avoided by use of a flexible drive.

Figure 2:
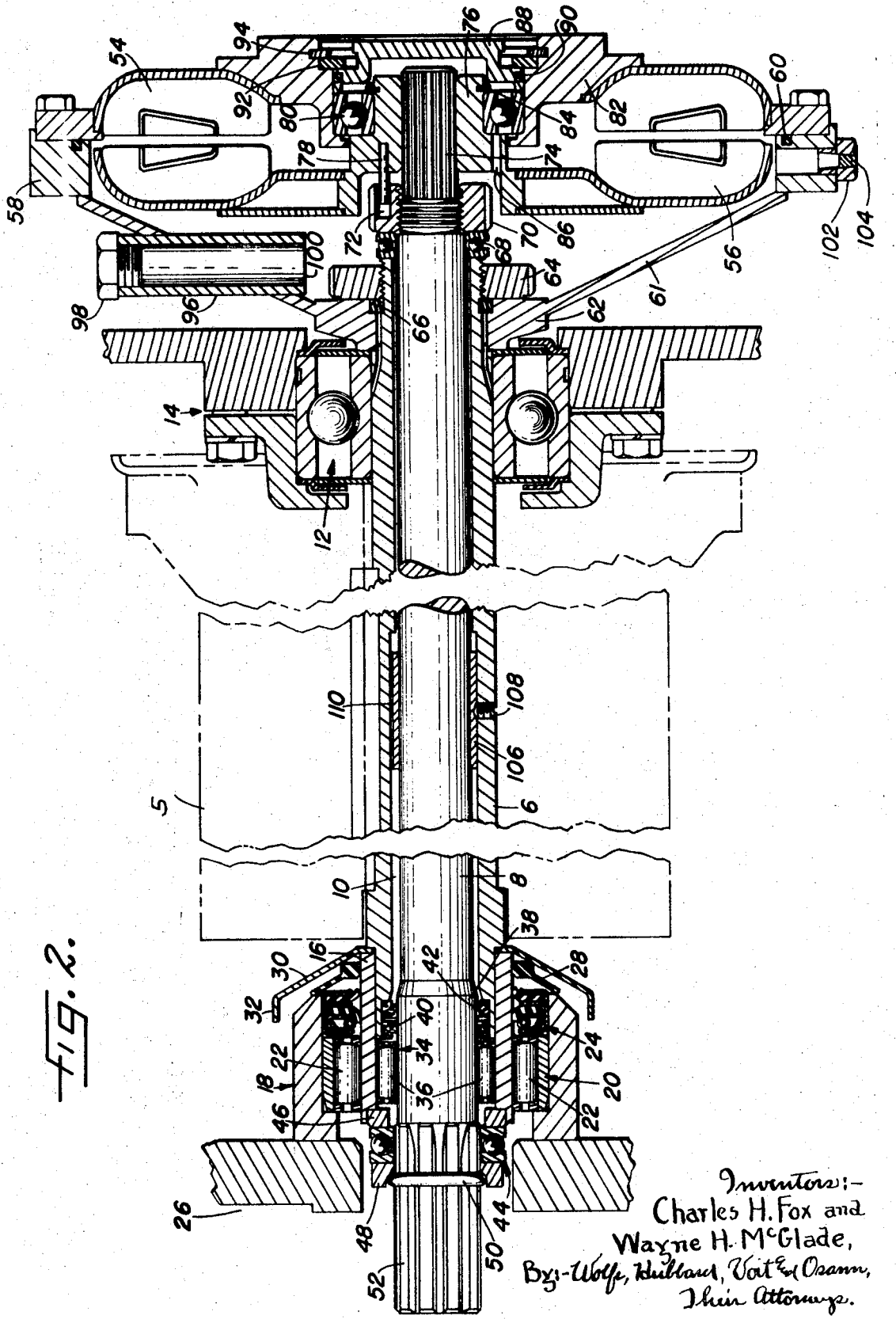
Figure 3:
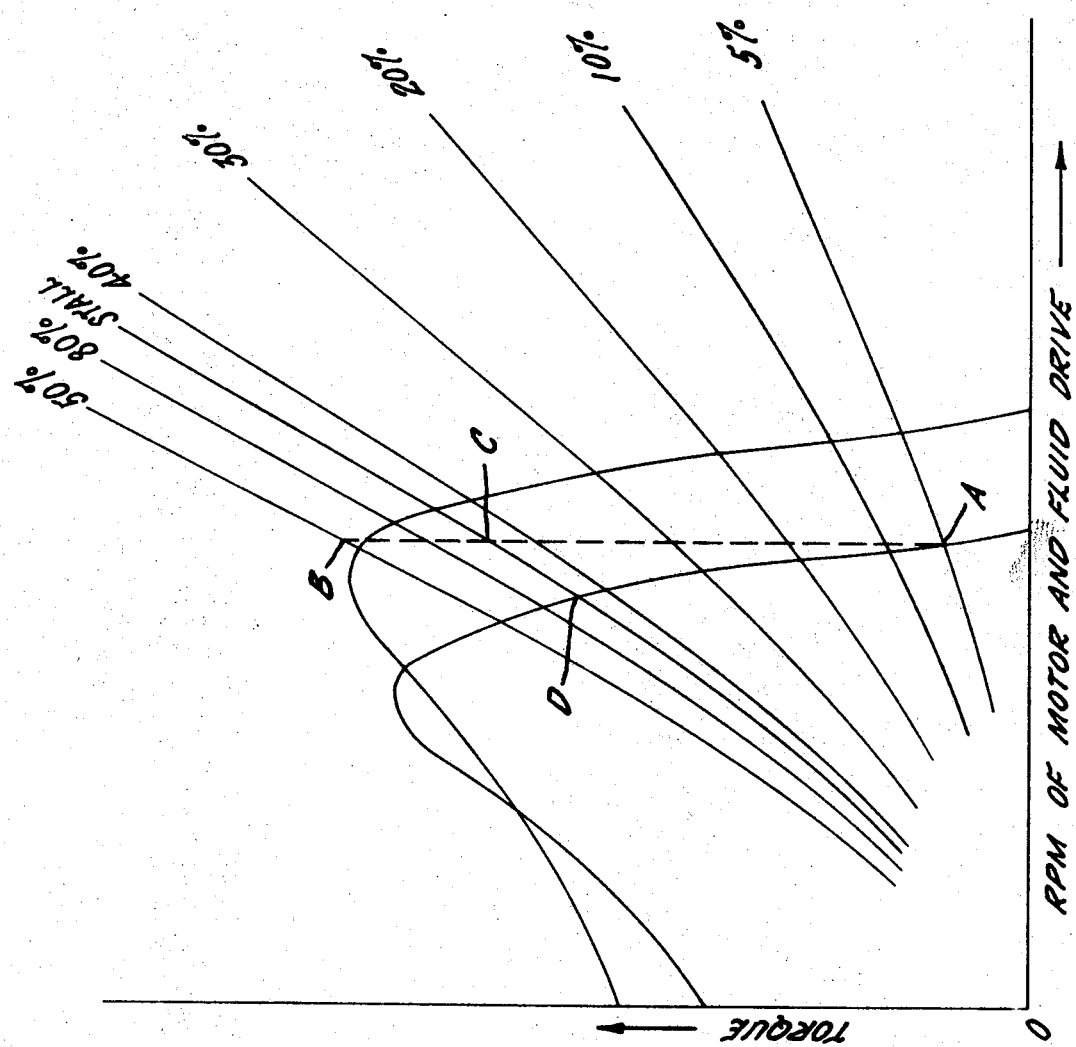

In the drawings:
FIG. 1 is a view of a portion of an elevating scraper; the spacing of the flights would locate a flight at the top of this figure, but closeness to the margin allows showing only the angle brackets by which the flight is mounted.
FIG. 2 is a view of the drive train for the scraper elevator, with parts broken away and in section to show details; and
FIG. 3 is a torque-speed chart setting forth a number of curves to illustrate the relationship of the several components to accomplish the results discussed above.

A portion of a conveyor is shown in FIG. 1 as having spaced flights 1 carried by brackets 1' on chain links 2 passing over a drive sprocket 3 which is mounted on and driven by a shaft 4. Referring now to FIG. 2, the torque source shown in phantom at 5 may be any suitable source of rotating power, but the phantom outline here shown is that of the rotor of a polyphase induction motor of the type shown in Patent 3,194,995—McGlade or 3,024,378—Isgren et al., both of which are assigned to the same assignee as the instant invention. Rotor 5 comprises a stack of laminations which is hollow to receive a motor drive shaft to which the lamination stack and other rotor structure may be keyed by a conventional drive key, as shown. In the application of the invention here shown, the hollow shaft 6 serves as the motor drive shaft, and a second shaft 8 is disposed in the bore of hollow shaft 6. The two shafts are held in annularly spaced relationship to provide an annular space 10.

A first antifriction bearing indicated generally at 12 is mounted adjacent one end of hollow shaft 6 in a first bearing support indicated generally at 14. At its opposite end, hollow shaft 6 carries, by means of a press fit, an annular journal element 16. A second bearing support is indicated generally at 18 and a second antifriction bearing 20 mounts the annular journal element 16 in second bearing support 18. In a preferred form of the invention, the rolling elements, two of which are shown at 22, of antifriction bearing 20 are in rolling contact with the external surface of annular journal element 16. A suitable lubricant seal 24 minimizes the loss of lubricant from the enclosure which is a gear box 26 past the antifriction bearing 20. A resilient boot 28 is provided to keep dirt out of the bearing, and a metal cone 30, flanged as shown at 32, is preferably provided to prevent damage of the boot 28.

To locate the shafts 6 and 8, making them coaxial with each other and with torque source 5, as well as providing the annular space 10 at the left end of the structure as seen in the drawing, a third antifriction bearing 34 having rolling elements 36 is shown disposed between annular journal element 16 and a journal surface 38 on shaft 8. In the preferred form of the invention, rolling elements 36 roll directly on the internal journal surface of element 16 on the surface 38, which is external, of shaft 8.

A double seal against lubricant flow is provided between shafts 6 and 8, preferably adjacent third antifriction bearing 34. Thus, a lubricant seal 40 minimizes the loss of lubricant from the gear box past antifriction bearing 34, and a seal 42 minimizes the loss of lubricant from annular space 10 into the space occupied by antifriction bearing 34.

A thrust bearing 44 is provided between thrust washers 46 and 48, washer 46 being disposed in a suitable counterbore in annular journal element 16, and washer 48 being held in place by a snap ring 50 on gear 52. Gear 52 may be any of a number of suitable helical or spur gears. Snap ring 50 engages a groove in the gear teeth which has a lesser depth than the teeth so that lubricant may flow in the spaces between the gear teeth under the snap ring.

A flexible drive connects the two shafts at the right end of the assembly as seen in the drawing; the flexible drive provides angular flexibility in the connection between the two shafts, but is comparatively inflexible in the radial direction so as to locate the two shafts radially with respect to each other, making them coaxial and providing the annular space referred to above. In the embodiment shown, the bore of hollow shaft 6 is stepped so that the annular space between the shafts in the plane of antifriction bearing 12 is less than it is near the left end of hollow shaft 6.

In the embodiment shown, the flexible drive is a coupling having an impeller 54 and a turbine 56. Impeller 54 is bolted to a ring 58, being suitably packed as at 60 against the loss of coupling fluid. Ring 58 forms a portion of the fluid coupling housing having a conical portion 61 to which a hub 62 is secured. Hub 62 is internally splined to engage external splines on hollow shaft 6. A nut 64 holds the splined hub on the hollow shaft, and a fluid seal 66 is provided to minimize fluid loss through the splines.

A second thrust bearing 68 is disposed at the right end of shaft 6 between the shaft end and a nut 70 threaded onto shaft 8. Nut 70 is provided with two holes one of which is shown at 72, the two holes being disposed so that $$x = \phi(n + \tfrac{1}{2})$$

where $\phi$ is the angle between adjacent splines of the splined end 74 of shaft 8, $n$ is any whole number, and $x$ is the angle between the hole centers, it being assumed that the holes are equidistant from the center of nut 70, and that the holes do not overlap.

Turbine 56 is mounted on a hub 76 which is internally splined to fit on splined end 74. Hub 76 carries a pin 78 which is adapted to engage one of the holes 72 in nut 70. The spacing between the holes, determined according to the above formula, is such that pin 78 is never more than $\tfrac{1}{4}\phi$ angle away from engagement with one of the holes. Accordingly, when nut 70 has been tightened to the specified torque, it needs to be turned ahead or back only a quarter of the angle between splines to get pin 78 into one of the holes, whereupon nut 70 is held locked in place.

A fourth antifriction bearing 80 is disposed between hub 76 and a hub 82 carried by impeller 54, and serves to locate the centers of shafts 6 and 8 with respect to each other, and fixes both of them in space by means of bearing 12; thus the flexible drive incorporates means to maintain the coaxial relationship of the shafts and the annular space between them. A snap ring 84 holds bearing 80 in place on hub 76.

A passage 86 in hub 76 provides for the flow of fluid to bearing 80 for lubrication. An end cap 88 has an external surface, packed as shown at 90, which cooperates with an internal surface in hub 82 to minimize the loss of lubricant to atmosphere from the fluid coupling by way of bearing 80. A washer 92 fits in a larger bore than the bore receiving and engaging the packing 90 and is held in said larger bore by a snap ring 94. Thus the packing 90 (preferably an O-ring) need not engage the sharp edges of a snap ring groove as cap 88 is slipped axially into position.

Conical portion 61 of the fluid coupling assembly is provided with a filler tube 96 which is closed by a threaded plug 98. The length of the tube at its inner end 100 is calculated so that, with tube 96 up and vertical, the fluid coupling has the right amount of oil when the tube is filled, because the rise of oil to the level of the tube end 100 traps air in the fluid coupling so that no more oil can flow into the cavity.

Ring 58 is tapped and threaded to receive a threaded plug 102, which is provided with a fusible center 104. The melting point of center 104 is designed such that melting occurs thirty seconds after stall of the conveyor to prevent the destruction, through overheating, of the torque source—for example, an electric motor which would "burn out" after forty-five seconds of running with the conveyor stalled.

Shock loading of pinion gear 52 often results in an undesirable deflection of shaft 8 inside hollow shaft 6. Deflection can be substantially eliminated by a bushing 106 secured in the bore of shaft 6 by a suitable set screw 108; ideally, bushing 106 is disposed at such a point between bearing 34 and the spline of hub 76 as will balance the forces on shaft 8 acting as a beam, although locations closer to the left end of the assembly (for reasons of manufacturing economy) can still keep the deflection within tolerable limits. Bushing 106 has a running fit with shaft 8, and is grooved, as at 110, to allow lubricant to flow throughout the annular space between shafts 6 and 8.

OPERATION

Because there is confusion even among those skilled in the art regarding the terminology used in connection with so-called "fluid drives," it will be understood that the term "fluid drive" as here used connotes a drive in which two physically separate annular members rotate in close proximity to each other in oil. One of the annular members is driven from an external source, and carries some of the oil with it, which impinges upon and thus drives the closely adjacent, other, annular member. One example of such a fluid drive is a "fluid coupling" (sometimes called a "hydraulic coupling"), in which there is no torque multiplication. A fluid drive which does accomplish torque multiplication in the oil is commonly called a "torque converter."

Looking at the drive train as a whole the input member may be taken as hollow shaft 6, and the output member is pinion gear 52; a yieldable element in the drive train is the fluid coupling. Load shocks on pinion 52 are absorbed in slip in the fluid coupling, and excessive deflection of the unsupported portion (between bearing 34 and hub 76) of shaft 8 is prevented by bushing 106.

The fluid coupling is a source of lubricant for bearings 12, 80, and 68. Coupling oil flows radially inward through thrust bearing 68, and past bushing 106 via one or more grooves 110, and thus lubricates the bore of the bushing as it rotates relative to shaft 8.

Considering the fluid coupling alone, impeller 54 is the input member and turbine 56 is the output member. Overheating of the fluid coupling quickly heats the oil to a point that fusible center 104 melts, whereupon the oil is lost and the drive train is broken. Other details of operation will be readily understood by those skilled in the art from the foregoing description in detail of the structure.

Reference was made above to Patents 3,024,378—Isgren et al. and 3,194,995—McGlade as disclosing and claiming motor structures of the type used in this invention. The motor, of which the rotor is here shown at 5 (in phantom so as not to obscure other details of this invention), is preferably used in an electrical system which is disclosed in detail and claimed in Patent 2,844,783—Chandler et al., issued July 22, 1958.

Passing now to a discussion in detail of the operation of a scraper embodying this invention, it is of course understood that in many scraper applications no problems are encountered, and in those applications, a simple, direct connection of the torque source with the gear box would be entirely satisfactory. However, scrapers are seldom operated in ideal conditions, and problems do arise, problems which cause a great deal of difficulty when an electric motor is directly mechanically connected with the gear box. Thus, operators do take too much of a "bite" with the scraper blade in the cut, and stall the conveyor, or the scraper sometimes encounters rocks, and again the conveyor stalls.

At this point, reference is made to FIG. 3 of the drawings, where the characteristics of electric motors and fluid drives such as are contemplated in this invention are illustrated. The vertical axis indicates torque, the horizontal axis indicates angular speed or r.p.m., and the intersection of these represents zero for both axes.

The two curves which intersect both axes are two of an entire family of curves showing electric motor torque at speeds fom zero to synchronous speed, each of these curves being for a given engine-and-alternator speed. One of the two curves, for example, shows the performance characteristics of the motor when the alternator runs at 1700 r.p.m., and the other curve for an alternator speed of 2000 r.p.m. From these curves, which are representative of the entire family of curves, it can be seen that the motor torque increases from a given locked-rotor value to a peak which is substantially greater than the locked-rotor torque. The peak is reached gradually, somewhere between (approximately) 65% and 75% of synchronous speed; thereafter, the torque falls off rather rapidly to zero at synchronous speed.

The other solid-line curves, though not completed to the zero point as here shown, actually start at zero and slope upwardly gradually as speed increases; these lines are comprised in a family of curves which show the torque-speed characteristics of a preferred fluid drive for various degrees of slip, ranging from 5% slip to stall, which of course is 100% slip. Note that the torque curve (not shown here) for any given, fixed, input speed plotted against slip "folds over," so that maximum torque occurs in the general vicinity of 50% slip (for a specific fluid drive). Accordingly, in the family of curves shown in FIG. 3, the curve showing the greatest fluid drive torque is the 50% slip curve; therefore, the curve showing torque at stall lies below the peak torque curve.

Considering torque-speed motor characteristics in the light of the foregoing discussion, it can be seen that an electric motor having a direct mechanical connection with the gear box would have unfavorable results as regards performance. Assume that the conveyor stalls for some reason, resulting in motor speed falling to zero. The motor torque at zero motor speed is substantially below maximum motor torque as can be seen from FIG. 3, and thus the operator cannot utilize the full potential of the electric motor. Moreover, the curves shown are based on zero heat build-up; a stalled electric motor would heat up rapidly, and its torque would fall rapidly below the indicated locked-rotor torque, still further diminishing the operator's chances of "pulling out" of a difficult situation.

Taking the same circumstances but driving the elevating conveyor through a fluid drive that is properly matched with the torque source (electric motor) as provided by this invention, it is noted that the fluid drive stall torque is always less than maximum motor torque so that the fluid drive stalls and the electric motor continues to run. Moreover, with the proper match, stall of the fluid drive takes place at a torque which, although less than maximum motor torque, is still well above locked-rotor torque. Consequently, the operator has a relatively high torque still available to help him restart the conveyor as he manipulates the scraper bowl or works with such other variables over which he still has some control.

For a better understanding of the forces involved and the problems to be solved, the fluid drive serves as a convenient base from which to view and analyze the whole power train or torque transmission problem. Thus, it is helpful to think in terms of: first means drivingly connecting the torque source 5 with the fluid drive input 54 and including all of the mechanism between those two elements 5 and 54; and second means drivingly connecting the fluid drive output 56 with the load (the dirt to be moved) and including all of the mechanism between element 56 and the dirt, the last element being any or all of the flights 1 in the embodiment shown. Moreover, the complete power train of necessity includes the fluid drive, which connects said first means and said second means.

In a discussion of the operation of the invention, it is important to point out that the drive here disclosed protects the driven elements from damage in case the load is stopped for any reason. Let it now be assumed that the alternator is running at 1700 r.p.m. and that the fluid drive is operating at 5% slip, or point A on the graph. The worst condition is a complete stop of the elevator.

In such a case, if the motor were mechanically connected directly to the gear box, the entire flywheel effect (the "WR$^2$" referred to above) would be applied to the gear 52 and the rest of the gear train. The torque would rise along a vertical line to a very high value—such as 2000 foot-pounds—which would almost certainly break off one or more teeth in the gear train or result in other damage. Said second means (any or all of the gears in gear box 26, or the conveyor, or the "weakest link" in this train) can absorb a predetermined maximum impulse input torque without damage; the maximum impulse input torque of the stored energy would often exceed said maximum.

In a drive according to this invention, the maximum possible input torque to the second means as defined above is as shown at point B on the graph, representing the maximum torque transmissible by the fluid drive, which is less than what said second means can take. The torque immediately drops back to its value at stall, point C, and holds at that point until all of the flywheel energy is dissipated. Thereafter, the torque falls back along the stall curve to point D, represented by the maximum motor torque for that engine speed.

Because the conveyor is stalled, the internal combustion engine on the prime mover slows down ("lugs down," in the terms of the trade), and the torque value continues to move down along the fluid drive stall curve.

At this point of the operation, note that the electric motor is heavily loaded, and perhaps heat begins to build up in the motor. Meanwhile, the fluid drive, operating at stall, is heating the oil in the drive. The motor and the fluid drive are so matched that fusible center 104 of fusible plug 102 melts and allows the oil to escape, thus interrupting the power train and unloading the electric motor before it gets hot enough to be destroyed by the temperature rise due to heat build-up.

This protection of the electric motor (or other torque source) is present in this invention at all times, not just when the load stalls completely. The load can increase quite gradually to the point that the torque source is overloaded so that it would destroy itself by continued running at such overload. In a drive made according to this invention, the torque source and the fluid drive are matched so that such overload increases the slip to the point that the oil temperature rises enough to melt the fusible plug before the torque source destroys itself.

When that happens, instead of replacing a motor or a gearbox, or some broken elevator chain links 2, broken flights 1, a broken sprocket 3, or a broken shaft 4, the operator (or a mechanic) replaces plug 102 and refills the fluid drive with oil, and the scraper is ready to go again.

While there is in this application specifically described one form which the invention may assume in practice, it will be understood that this form of the same is shown for purposes of illustration and that the invention may be modified and embodied in various other forms without departing from its spirit or the scope thereof.

We claim as our invention:

1. In combination, a first shaft adapted to be rotated by a source of torque, a fluid coupling having an impeller and a turbine, the impeller connected to be driven by the first shaft, a second shaft connected to be driven by the turbine and substantially coaxial with the first shaft, one shaft being hollow to receive the other shaft in annular spaced relation, an output member drivingly connected with the second shaft, an annular journal element having internal and external journal surfaces and removably secured to the hollow shaft, rolling elements of an anti-friction bearing disposed between the annular journal element and said other shaft and in rolling contact with said internal surface, a load-bearing support, and rolling elements of a second anti-friction bearing between the annular journal element and the load-bearing support and in rolling contact with said external surface.

2. In combination, a first shaft adapted to be rotated by a source of torque, a fluid coupling having an impeller and a turbine, the impeller connected to be driven by the first shaft, a second shaft connected to be driven by the turbine and substantially coaxial with the first shaft, one shaft being hollow to receive the other shaft in annular spaced relation, an output member drivingly connected with the second shaft, a bushing in the annular space to prevent contact between the bore of the hollow shaft and the surface of said other shaft, passage means in the bushing to permit the flow of fluid from the fluid coupling substantially throughout the space between the shafts, radial load-bearing means between the shatfs adjacent the output member, and a fluid seal in the annular space adjacent the load-bearing means.

3. In combination, a hollow shaft, a first bearing support, an anti-friction bearing supporting one end of the hollow shaft in said first bearing support, an annular journal element at the other end of the hollow shaft, a second bearing support, a second anti-friction bearing mounting the annular journal element in the second bearing support, a second shaft rotatable inside the hollow shaft, a third anti-friction bearing mounting the second shaft in the annular journal element, a flexible drive having an input and an output and having a source of lubricant, means connecting the input with one of the two shafts, means connecting the output with the other of the two shafts, said connecting means including means to locate the two shafts relative to the first-named bearing and to each other, a lubricant seal between the shafts adjacent the third anti-friction bearing, a bushing between the two shafts and axially between the first-named anti-friction bearing and the third anti-friction bearing to prevent contact between the bore of the hollow shaft and the surface of the second shaft, and passage means in the bushing to permit lubricant flow substantially throughout the space between the shafts.

4. In a self-loading scraper having an endless conveyor provided with spaced flights, a drive train for the conveyor comprising, in combination, a torque source, a first shaft driven by the torque source, a fluid coupling having an impeller and a turbine, the impeller connected to be driven by the first shaft, a second shaft driven by the turbine, the torque source and one shaft being hollow and coaxial in relation to the other shaft and to each other with said other shaft passing through said one shaft and both shafts passing through the torque source, the two shafts disposed with an annular space between them to permit angular movement of one shaft relative to the other, and an output member drivingly connected with said second shaft.

References Cited
UNITED STATES PATENTS

| | | | |
|---|---|---|---|
| 2,539,534 | 1/1951 | Eckhardt | 64—28X |
| 2,380,595 | 7/1945 | Hertrich | 103—87A |
| 2,844,783 | 7/1958 | Chandler et al. | 320—27X |
| 2,868,438 | 1/1959 | Gammon et al. | 230—117 |
| 2,983,102 | 5/1961 | Sinclair | 60—54 |
| 3,024,378 | 3/1962 | Isgren et al. | 310—61X |
| 3,048,934 | 8/1962 | Hancock | 37—8 |

ROBERT E. PULFREY, Primary Examiner

E. H. EICKHOLT, Assistant Examiner

U.S. Cl. X.R.

60—54; 64—28; 74—730; 192—56; 198—203; 318—473